United States Patent
Kim et al.

(10) Patent No.: US 10,138,436 B2
(45) Date of Patent: Nov. 27, 2018

(54) SYSTEM AND METHOD FOR CONVERTING FOOD WASTE INTO FUEL

(71) Applicant: KOREA INSTITUTE OF CIVIL ENGINEERING AND BUILDING TECHNOLOGY, Gyeonggi-Do (KR)

(72) Inventors: Tae Hyung Kim, Gyeonggi-Do (KR); Eun Ju Kim, Gyeonggi-Do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 81 days.

(21) Appl. No.: 14/769,446

(22) PCT Filed: Jun. 12, 2013

(86) PCT No.: PCT/KR2013/005174
§ 371 (c)(1),
(2) Date: Aug. 20, 2015

(87) PCT Pub. No.: WO2014/175508
PCT Pub. Date: Oct. 30, 2014

(65) Prior Publication Data
US 2016/0002549 A1  Jan. 7, 2016

(30) Foreign Application Priority Data
Apr. 22, 2013 (KR) .................. 10-2013-0044444

(51) Int. Cl.
*C10L 3/06*   (2006.01)
*C10L 5/46*   (2006.01)
*C10L 3/08*   (2006.01)

(52) U.S. Cl.
CPC .................... *C10L 3/06* (2013.01); *C10L 5/46* (2013.01); *C10L 3/08* (2013.01);
(Continued)

(58) Field of Classification Search
CPC .............................................. C10J 2300/1292
See application file for complete search history.

(56) References Cited

U.S. PATENT DOCUMENTS

| 4,354,936 A | 10/1982 | Ishida et al. |
| 5,688,686 A * | 11/1997 | Nakajima ............... B01F 7/30 366/297 |

(Continued)

FOREIGN PATENT DOCUMENTS

| JP | 07-133175 | 5/1995 |
| JP | 4907112 | 1/2012 |

(Continued)

OTHER PUBLICATIONS

"International Search Report (Form PCT/ISA/210)", dated Nov. 12, 2013, with English translation thereof, pp. 1-4, in which five of the listed references (KR10-2004-0017517, U.S. Pat. No. 4,354,936, JP4907112, JP07-133175 and KR10-2011-0068407) were cited.

*Primary Examiner* — Matthew J Merkling
(74) *Attorney, Agent, or Firm* — JCIPRNET (57) ABSTRACT

A system for converting food waste into fuel includes at least one thermal decomposition reactor. The at least one thermal decomposition reactor is configured to transfer an organic waste, that is, food waste, through a region on which a sunlight is concentrated by at least one solar concentrator. A fermenter is disposed at a front end of the at least one thermal decomposition reactor, and any thermal energy remaining after being used in the at least one thermal decomposition reactor is additionally used in fermentation of the food waste. A method of converting food waste into fuel is also provided.

2 Claims, 9 Drawing Sheets

(52) U.S. Cl.
CPC ... *C10L 2200/0469* (2013.01); *C10L 2290/02* (2013.01); *C10L 2290/06* (2013.01); *C10L 2290/26* (2013.01); *C10L 2290/36* (2013.01); *C10L 2290/58* (2013.01); *Y02E 50/10* (2013.01); *Y02E 50/30* (2013.01); *Y02E 50/343* (2013.01)

(56) References Cited

U.S. PATENT DOCUMENTS

| | | | |
|---|---|---|---|
| 8,821,599 B2 | 9/2014 | Perkins et al. | |
| 2008/0115415 A1* | 5/2008 | Agrawal | C01B 31/20 48/101 |
| 2009/0013828 A1* | 1/2009 | Martinis | C21B 13/0073 75/505 |
| 2009/0031615 A1* | 2/2009 | Joshi | C10G 2/32 44/307 |
| 2009/0084666 A1* | 4/2009 | Agrawal | C10B 49/22 201/2.5 |
| 2010/0237291 A1 | 9/2010 | Simmons et al. | |
| 2013/0026417 A1* | 1/2013 | Paquet | C10J 3/485 252/373 |
| 2015/0175916 A1* | 6/2015 | Klein | C01B 3/025 423/359 |

FOREIGN PATENT DOCUMENTS

| | | |
|---|---|---|
| KR | 10-2004-0017517 | 2/2004 |
| KR | 10-2011-0068407 | 6/2011 |
| WO | 2010110772 | 9/2010 |

* cited by examiner

SYSTEM AND METHOD FOR CONVERTING FOOD WASTE INTO FUEL

CROSS-REFERENCE TO RELATED APPLICATION

This application is a 371 application of the International PCT application serial no. PCT/KR2013/005174, filed on Jun. 12, 2013, which claims the priority benefit of Korean application no. 10-2013-0044444, filed on Apr. 22, 2013. The entirety of each of the abovementioned patent applications is hereby incorporated by reference herein and made a part of this specification.

BACKGROUND

1. Field of the Invention

The present invention relates to a system for converting food waste into fuel, and more particularly, to a system and a method for converting food waste into fuel through thermal decomposition by transferring the food waste, which is an organic waste, in a thermal decomposition reactor to pass through a region in which sunlight is concentrated by a solar concentrator.

2. Discussion of Related Art

Due to the depletion of fossil fuels, interest in the development of renewable energy technology is globally increasing, and in Korea, mandated low-carbon systems including introduction of the renewable energy portfolio standard are being developed, and as sea disposal is overall prohibited from 2013 with the implementation of the Marine Technology Management Act, development of a new plant capable of treating food waste, human excreta, etc. is required.

Food waste is food garbage disposed of from homes or restaurants, and accounts for approximately 30% of household waste along with an improved quality of the life. A food waste disposal rate in Korea has continuously increased 3% per year from 14,500 m$^3$/day in 2007 to 17,100 m$^3$/day in 2012. Accordingly, the annual economic loss caused by the disposed of food is 18 trillion won.

Such food waste is an organic material having a water content of 80 to 90%, and can be used as a substrate for producing feed, compost or biogas, and the feed produced from the food waste can be used for livestock. However, due to the uncertainty in demand and supply, the possibility of generating a disease in livestock, and incorporation of foreign substances, such feed can directly and indirectly damage livestock, and particularly, there is a problem in that the consumer is limited.

In addition, when left without any treatment, the food waste causes second environmental pollution due to a leachate, that is, soil acidification and an odor, and therefore the treatment of the food waste is, environmentally, an important issue. As a method of treating such food waste, incineration using an incinerator, burying in a predetermined landfill or recycling into feed or compost may be used.

However, the incineration of food waste is accompanied by incinerating costs and serious environmental problems caused by an environmentally harmful material such as a dioxin generated from incineration and an odor. In addition, the burying in a predetermined landfill is not a preferable method in Korea which has a small landmass and high population density, this is because soil or underground water is polluted due to the leachate generated from the buried food waste and thus a broad landfill for water reclamation is needed.

However, recently, food waste, which is an organic waste, has been reevaluated as a resource, and thus organic waste recycling is in the limelight.

As prior art relating to recycling of an organic waste, U.S. Patent Publication No. 2010-237291, entitled "Systems and Methods for Solar-Thermal Gasification of Biomass" is disclosed, and will be described with reference to FIGS. 1A and 1B.

Figure 1A:
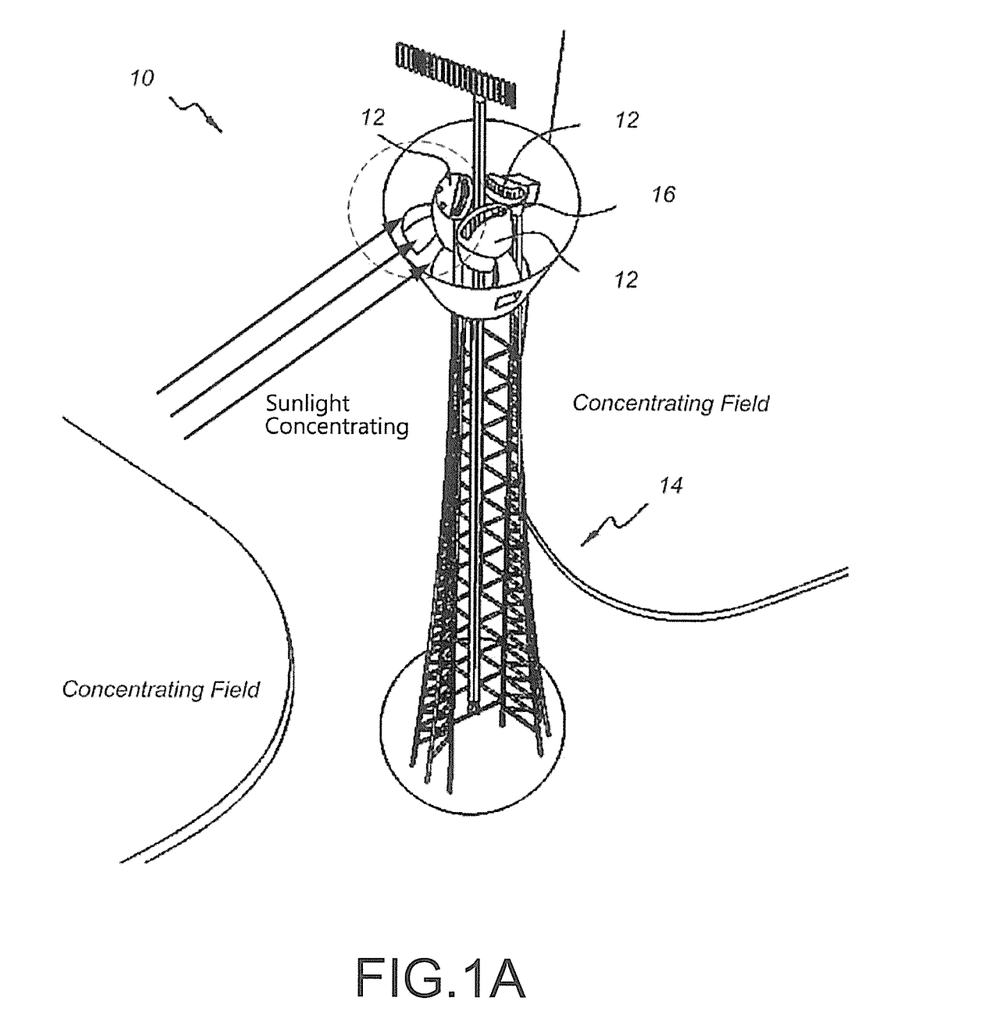
FIGS. 1A and 1B are diagrams illustrating a structure of a solar tower according to the conventional art.
Figure 1B:
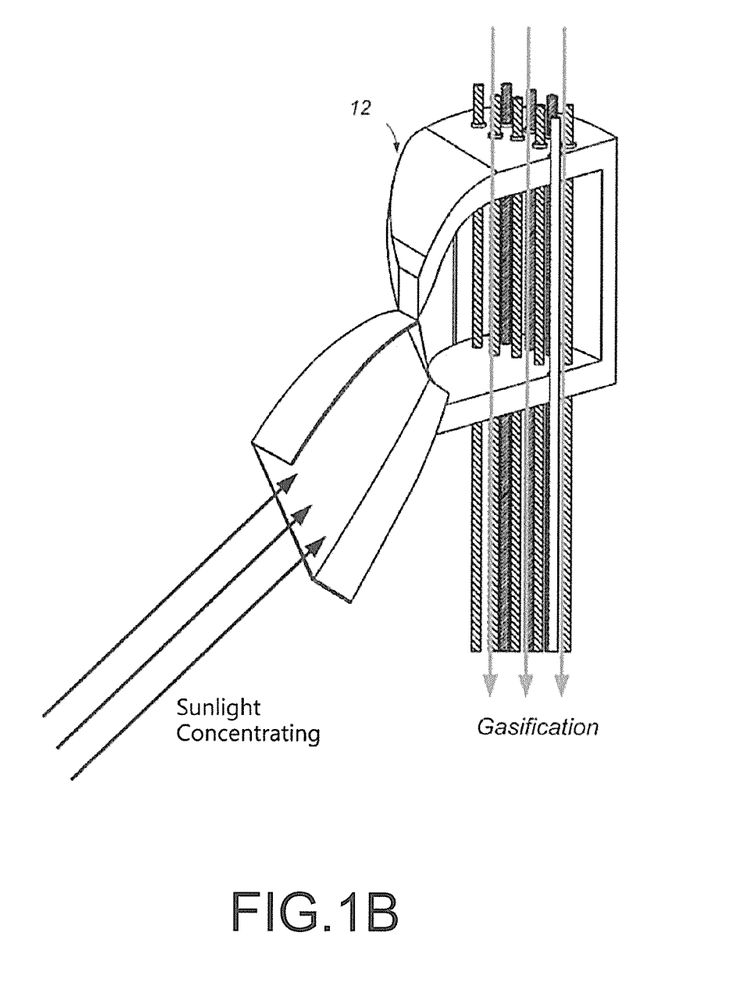

FIGS. 1A and 1B are diagrams illustrating a structure of a solar tower according to the conventional art, in which FIG. 1A shows a structure of a solar tower, and FIG. 1B is a diagram for explaining a concept of gasification.

Referring to FIG. 1A, the solar tower 10 according to the conventional art is provided to gasify a biomass using high-temperature concentrated solar radiant heat, and includes a plurality of concentrators 12, a concentration field 14 and a reactor 16, and as shown in FIG. 1B, a biomass powder is passed in a state of being mixed with a carrier medium and is gasified by the concentrated solar radiant heat, and a wall of each tube in the reactor 16 may be formed of a transparent material to facilitate transfer of radiant heat.

The solar tower 10 according to the conventional art easily ensures a high temperature and has high efficiency since thermal conversion does not occur, but needs a high cost to construct the plurality of solar concentrators 12 and the solar tower 10. The above disadvantage can be solved by depositing a separate reactor 16 to correspond to each solar concentrator 12, and an organic waste is provided to each reactor 16 in an amount that can be treated by a single concentrator.

Further specifically examining the tradeoff when the structure of the solar tower 10 according to the conventional art is used, as the advantage, since equipment for converting solar energy into electricity or heat is not used, an energy utilization rate is high, and since sunlight concentrated from the plurality of solar concentrators 120 disposed in the concentration field 14, it is easy to ensure a high temperature for gasification. In addition, since it is easy to ensure a high temperature, a large amount of biomass can be gasified within a relatively fast time and thus a fuel can be stably supplied.

However, the solar tower 10 according to the conventional art needs a wide space to install the plurality of solar concentrators 120. In addition, the equipment and energy to transfer the biomass to the reactor 16 disposed at a front end of the solar tower 10 with a considerable height are needed. In addition, to facilitate the transfer, the biomass is formed in a powder, and in some cases, a separate carrier medium (vapor) is needed. In addition, a part of the radiant energy remains unutilized and is dispersed to the surroundings.

Meanwhile, as another prior art, International Application Publication No. WO2010-110772, entitled "Solar-Based Power Generator" is disclosed, which will be described with reference to FIG. 2.

Figure 2:
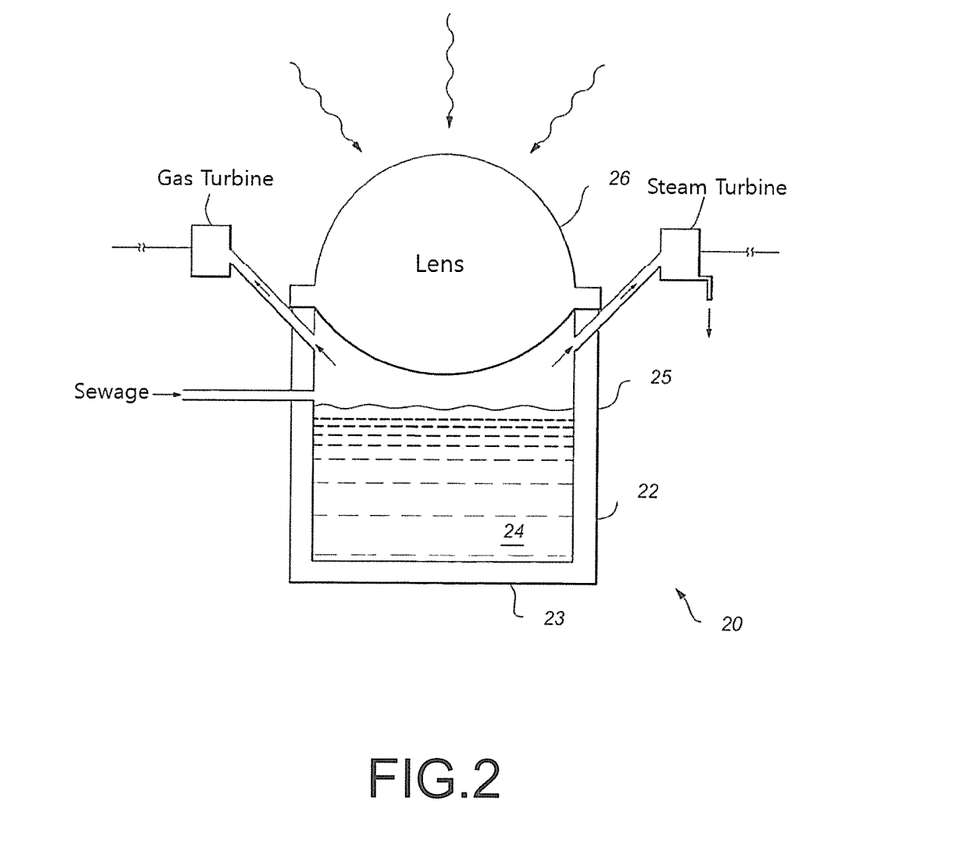
FIG. 2 is a diagram illustrating a configuration in which one lens (solar concentrator) corresponds to one reactor in a solar-based power generator according to the conventional art.

FIG. 2 is a diagram illustrating a configuration in which one lens (solar concentrator) corresponds to one reactor in the solar-based power generator according to the conventional art.

Referring to FIG. 2, the solar-based power generator 20 according to the conventional art is a system for generating available power from water 24 by driving a turbine by gasifying and converting an organic material in a sewage system into steam through concentration of solar energy, and includes a base 23, at least one side wall 25 and a reactor 22 including an open upper portion. Here, one lens (solar concentrator) is configured to correspond to one reactor 22, and in this case, the sunlight concentrated by the lens 26 induces thermal decomposition of an organic material included in sewage around a focal point, driving of a steam turbine using steam generated herein, and driving of a gas turbine using methane generated thereby to generate electricity.

The solar-based power generator 20 according to the conventional art has an advantage of a low cost, and a disadvantage in that thermal decomposition at a high temperature only takes place at a focal point of the lens 16. More specifically examining the tradeoff when such a structure in which one lens (solar concentrator) corresponds to one reactor is used, the advantage is a high energy utilization rate obtained because equipment for converting solar energy into electricity or heat is not used. In addition, since sunlight is concentrated using a lens 26, a separate space for installing a reflective mirror is not necessary. In addition, since sunlight is concentrated using the lens 26, a high structure such as the conventional solar tower is not necessary. In addition, since the biomass is decomposed in a space inside the enclosed reactor 22, solar energy incident to the reactor 22 through the lens 26 can be used maximally.

However, in the solar-based power generator 20 according to the conventional art, a high temperature is generated only in a region in which light is concentrated by the lens 26, thermal decomposition or vapor generation is carried out, and a high temperature necessary for thermal decomposition or vapor generation is not generated in a different region.

SUMMARY OF THE INVENTION

A technical object to be realized in the present invention to solve the above problems is to provide a system and a method for converting food waste into fuel, which is configured to transfer an organic waste, that is, food waste, in a thermal decomposition reactor to pass through a region on which a solar light is concentrated by a solar concentrator, so as to decrease an installation cost, compared to the conventional multiple solar concentrators and solar tower and solve the conventional problem of high-temperature thermal decomposition performed only at the focal point of a lens.

Another technical object to be realized in the present invention is to provide a system and a method for converting food waste into fuel by disposing a fermenter at a front end of a thermal decomposition reactor and using thermal energy remaining after used in the thermal decomposition reactor to ferment food waste, thereby increasing the efficiency of the system.

Still another technical object to be realized in the present invention is to provide a system and a method for converting food waste into fuel, in which a fen center and a thermal decomposition reactor are configured to be sealed, and a generated biogas and an air containing an odor are separated from a product and collected.

As a means for accomplishing the above-described technical goal, a system for converting food waste into fuel by thermally decomposing food waste according to the present invention is provided. The system includes a food waste storage tank storing food waste collected from a region; a solar concentrator collecting a sunlight and concentrating the sunlight on a predetermined region; a thermal decomposition reactor disposed in the predetermined region on which the sunlight is concentrated by the solar concentrator to thermally decompose the food waste and discharge a product; a transferring device transferring the food waste to the thermal decomposition reactor from the food waste storage tank; and a fermenter disposed at a front end of the thermal decomposition reactor, temporarily containing the food waste transferred from the food waste storage tank before it is provided to the thermal decomposition reactor and fermenting the food waste. The food waste is transferred in the thermal decomposition reactor and thermally decomposed while passing through a predetermined region on which sunlight is concentrated by the solar concentrator, and the transferring device transfers the food waste in the thermal decomposition reactor at a controlled speed to thermally decompose the food waste.

The system for converting food waste into fuel according to an exemplary embodiment of the present invention may further include a collecting duct collecting a biogas generated from the thermal decomposition reactor and an air including an odor, which are separated from a product. Here, the biogas may be methane gas.

The system for converting food waste into fuel according to an exemplary embodiment of the present invention may further include a controller controlling a transfer speed of the transferring device, driving of the solar concentrator and a thermal decomposition reaction of the thermal decomposition reactor.

Here, the food waste thermally decomposed in the thermal decomposition reactor is discharged through the region in which the fermenter is disposed, and thereby thermal energy is provided to ferment the food waste contained in the fermenter.

Here, the solar concentrator includes a plurality of solar concentrators and the thermal decomposition reactor includes a plurality of thermal decomposition reactors. Each of the thermal decomposition reactors is disposed in the predetermined region of each solar concentrator concentrating a sunlight and is provided with the food waste in an amount that can be treated by the single solar concentrator, and the transfer rate of the provided food waste is controlled.

Here, the thermal decomposition reactor and the fermenter are formed to be sealed to remove an odor.

As another means for accomplishing the above-described technical goal, a method of converting food waste into fuel by thermally decomposing food waste according to the present invention is provided. The method includes a) collecting food waste and storing the food waste in a food waste storage tank; b) transferring the food waste stored in the food waste storage tank to a thermal decomposition reactor via a fermenter; c) temporarily containing the food waste stored in the food waste storage tank and fermenting the food waste in the fermenter; d) concentrating a sunlight on a predetermined region by a solar concentrator; e) thermally decomposing the transferred food waste in a thermal decomposition reactor disposed in the predetermined region on which the sunlight is concentrated to discharge a product containing a biogas; and f) collecting the product discharged from the thermal decomposition reactor. Here, the food waste is transferred in the thermal decomposition reactor and thermally decomposed while passing through the predetermined region on which the sunlight is concentrated by the solar concentrator.

Here, the food waste thermally decomposed in the thermal decomposition reactor in the operation e) is discharged through the region in which the fermenter is disposed, and thereby thermal energy is provided to ferment the food waste contained in the fermenter.

Here, in the operation c), the transferring device allows the food waste to be transferred in the thermal decomposition reactor at a controlled speed to thermally decompose the food waste.

Here, the solar concentrator includes a plurality of solar concentrators and the thermal decomposition reactor includes a plurality of thermal decomposition reactors. Each thermal decomposition reactor is disposed in the predetermined region of each solar concentrator concentrating a sunlight, and provides the food waste in an amount that can be treated by a single solar concentrator.

Here, in the operation f), a biogas generated from the thermal decomposition reactor and an air containing an odor are separate from a product and collected, and the biogas may be methane gas.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The present invention provides a system for converting food waste into fuel by thermally decomposing the food waste. The system includes a food waste storage tank in which food waste collected from a region is stored; a solar concentrator collecting sunlight and concentrating the sunlight on a predetermined region; a thermal decomposition reactor disposed in the predetermined region on which the sunlight is concentrated by the solar concentrator to thermally decompose the food waste and discharge a product; a transferring device transferring the food waste to the thermal decomposition reactor from the food waste storage tank; and a fermenter disposed at a front end of the thermal decomposition reactor, temporarily containing the food waste transferred from the food waste storage tank before providing it to the thermal decomposition reactor, and fermenting the food waste. The food waste is transferred in the thermal decomposition reactor and thermally decomposed while passing through the predetermined region on which a sunlight is concentrated by the solar concentrator, and the transferring device transfers the food waste in the thermal decomposition reactor at a controlled speed to perform thermal decomposition of the food waste.

The present invention provides a method of converting food waste into fuel by thermally decomposing the food waste. The method includes a) collecting food waste and storing the food waste in a food waste storage tank; b) transferring the food waste stored in the food waste storage tank to a thermal decomposition reactor via a fermenter; c) temporarily containing the food waste stored in the food waste storage tank and fermenting the food waste in the fermenter; d) concentrating a sunlight on a predetermined region by a solar concentrator; e) thermally decomposing the transferred food waste in the thermal decomposition reactor disposed in the predetermined region on which the sunlight is concentrated and producing a product containing a biogas; and collecting the product discharged from the thermal decomposition reactor. The food waste is transferred in the thermal decomposition reactor and thermally decomposed while passing through the predetermined region on which the sunlight is concentrated by the solar concentrator.

Hereinafter, exemplary embodiments of the present invention will be described in detail with reference to the accompanying drawings to easily realize the present invention by those of ordinary skill in the art. However, the present invention may be realized in various different forms, and therefore is not limited to examples to be described herein. In addition, to clearly explain the present invention, parts not relating to the descriptions will be omitted, and like reference marks denote the like parts through the specification.

Through the specification, when one part "includes" one component, unless particularly defined otherwise, it means that the part further includes another component, not excluding the component.

Figure 3:
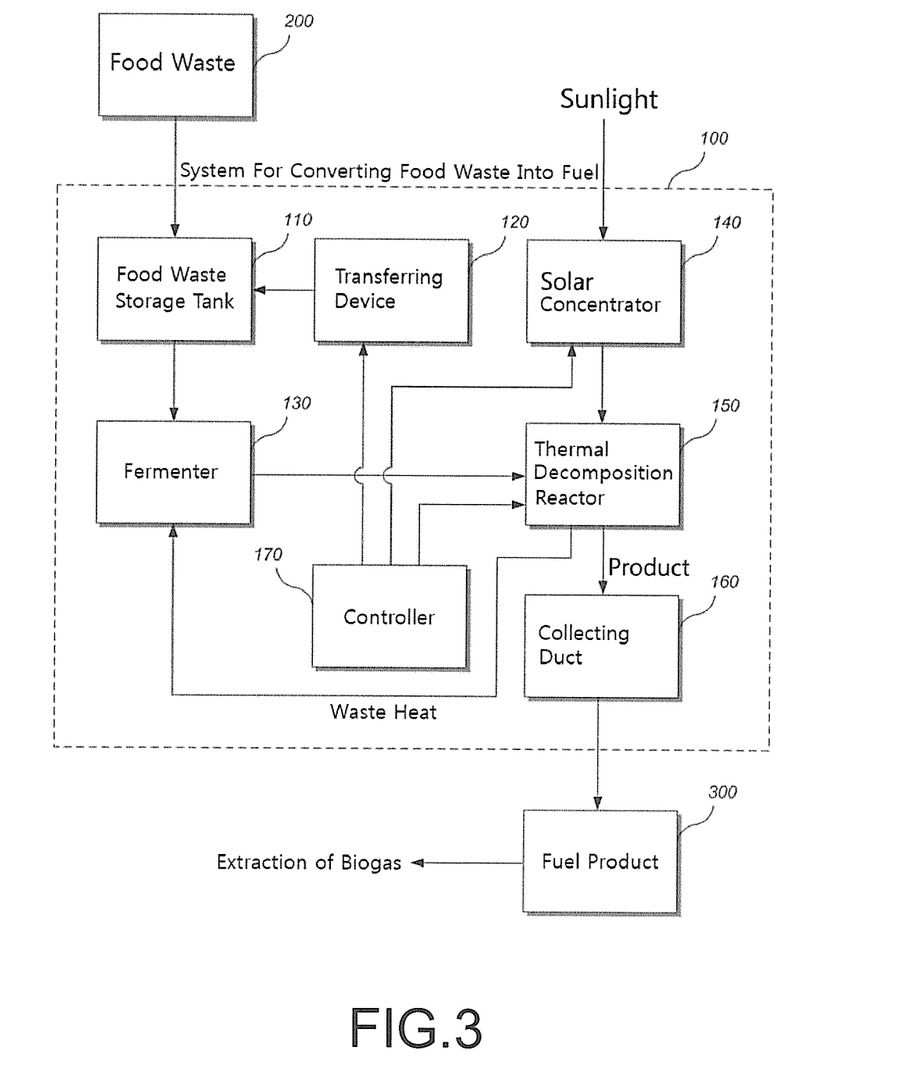
FIG. 3 is a block diagram of a system for converting food waste into fuel according to an exemplary embodiment of the present invention.
Figure 4:
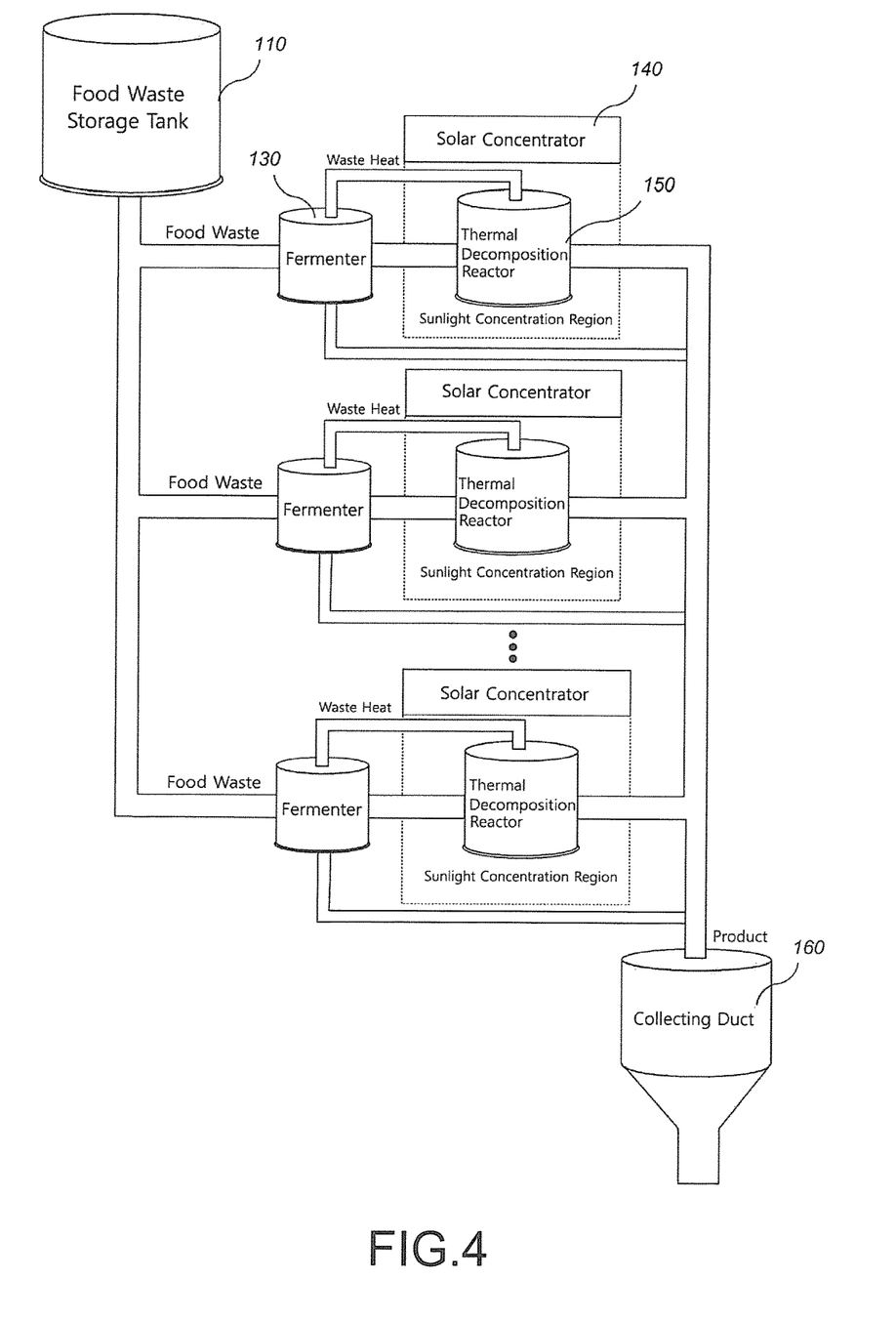
FIG. 4 is a diagram specifically illustrating the system for converting food waste into fuel according to the exemplary embodiment of the present invention.

FIG. 3 is a block diagram of a system for converting food waste into fuel according to an exemplary embodiment of the present invention, and FIG. 4 is a diagram specifically illustrating the system for converting food waste into fuel according to the exemplary embodiment of the present invention.

Referring to FIGS. 3 and 4, the system 100 for converting food waste into fuel by thermally decomposing the food waste according to the exemplary embodiment of the present invention includes a food waste storage tank 110, a transferring device 120, a fermenter 130, a solar concentrator 140, a thermal decomposition reactor 150, a collecting duct 160 and a controller 170.

The food waste storage tank 110 stores food waste 200 collected from a region. Here, the food waste 200 stored in the food waste storage tank 110 may be provided to the fermenter 130 and the thermal decomposition reactor 150 by the transferring device 120.

A plurality of the solar concentrators 140 may be disposed, and serve to concentrate a collected sunlight on a predetermined region, that is, a light concentration region, and provide a high temperature to the thermal decomposition reactor 150.

A plurality of the thermal decomposition reactors 150 may be disposed in the light concentration region, which is the predetermined region on which a sunlight is concentrated by the solar concentrator 140, so as to thermally decompose the food waste 200 and discharge a product. Here, it is obvious to those of ordinary skill in the art that the thermal decomposition reactor 150 thermally decomposes the food waste 200 at a high temperature, thereby discharging the product.

The fermenter 130 is disposed at a front end of the thermal decomposition reactor 150, temporarily contains the food waste 200 transferred from the food waste storage tank 110 before it is provided to the thermal decomposition reactor 150, and ferments the food waste 200. Accordingly, in the system 100 for converting food waste into fuel according to an exemplary embodiment of the present invention, the fermenter 130 is disposed at the front end of the thermal decomposition reactor 150, and any thermal energy remaining after being used in the thermal decomposition reactor 150 is used in fermentation of the food waste 200, and thus efficiency of the system may be increased.

The transferring device 120 transfers the food waste 200 to the thermal decomposition reactor 150 from the food waste storage tank 110. Here, the transferring device 120 is transferred in the thermal decomposition reactor 150 at a controlled speed to thermally decompose the food waste 200, and the food waste 200 thermally decomposed in the thermal decomposition reactor 150 is discharged through the region in which the fermenter 130 is disposed, and thereby thermal energy is provided to ferment the food waste 200 contained in the fermenter 130. Accordingly, in the system 100 for converting food waste into fuel according to the exemplary embodiment of the present invention, an organic waste, that is, the food waste 200, may be transferred in the thermal decomposition reactor 150 and passes through the region on which a sunlight is concentrated by the solar concentrator 140, thereby reducing a high cost generated by the conventional multiple solar concentrators and solar tower, and solving a problem of high temperature thermal decomposition occurring only at the focal point of a lens.

The collecting duct 160 collects a biogas generated from the thermal decomposition reactor 150 and an air containing an odor, which are separated from the product, and the biogas may be extracted from a fuel product 300 separated by the collecting duct 160. Here, the biogas may be methane gas. Accordingly, the system 100 for converting food waste into fuel according to an exemplary embodiment of the present invention has the fermenter 130 and the thermal decomposition reactor 150 configured to be sealed, and collects the generated biogas and an air containing an odor after they are separated from the product.

The controller 170 performs overall control of the system 100 for converting food waste into fuel according to the exemplary embodiment of the present invention, for example, controlling a transfer speed of the transferring device 120, driving of the solar concentrator 140, and a thermal decomposition reaction of the thermal decomposition reactor 150. Here, it is obvious to those of ordinary skill in the art that the controller 170 controls the transfer speed of the transferring device 120, the driving of the solar concentrator 140 and the thermal decomposition reaction of the thermal decomposition reactor 150, and thus the detailed descriptions thereof will be omitted.

Therefore, the food waste 200 is transferred in the thermal decomposition reactor 150, and thermally decomposed while passing through the predetermined region on which a sunlight is concentrated by the solar concentrator 140, and the transferring device 120 transfers the food waste 200 in the thermal decomposition reactor 150 at a controlled speed to thermally decompose the food waste 200.

Specifically, referring to FIG. 4, the thermal decomposition reactor 150 is disposed for each solar concentrator 140, and the food waste 200 thermally decomposed in the thermal decomposition reactor 150 may be discharged through the region in which the fermenter 130 is disposed so as to provide thermal energy to ferment the food waste 200 contained in the fermenter 130. Here, the thermal decomposition reactor 150 and the fermenter 130 may be formed to be sealed to remove an odor.

That is, there are pluralities of the solar concentrator 140 and the thermal decomposition reactor 150, and each thermal decomposition reactor 150 is disposed in each region of the solar concentrator 140 on which a sunlight is concentrated and provides the food waste 200 in an amount that can be treated by a single solar concentrator 140. Here, a transfer speed of the provided food waste 200 may be controlled.

As a result, the system 100 for converting food waste into fuel according to an exemplary embodiment of the present invention thermally decomposes the food waste 200, which is an organic waste, using solar radiant energy. Here, a transfer speed of the food waste 200 is controlled to uniformly perform thermal decomposition. In addition, the fermenter may be disposed at a front end of the thermal decomposition reactor 150 to perform a fermentation process using residual waste heat of the thermal decomposition.

Figure 5:
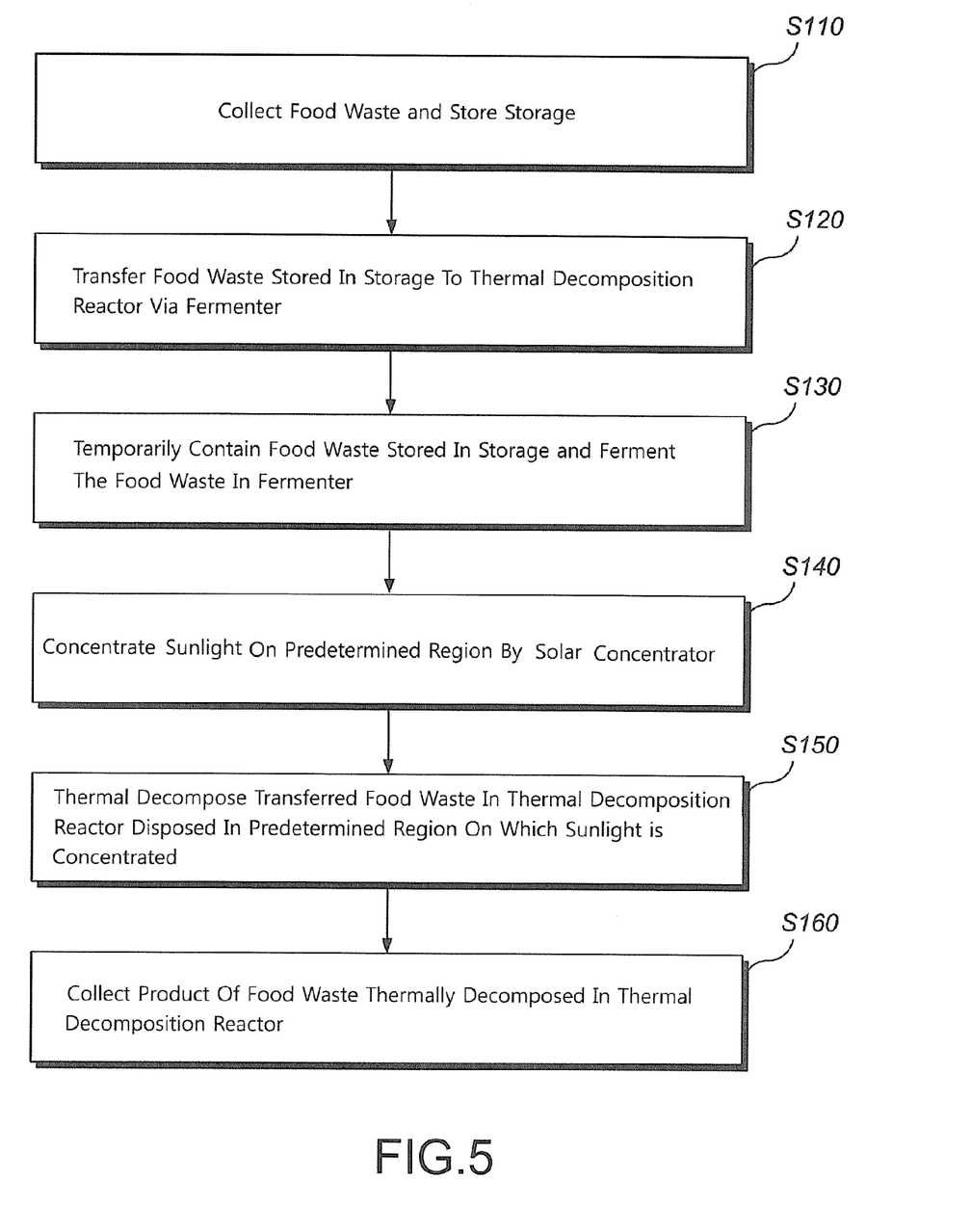
FIG. 5 is a flowchart illustrating a method of converting food waste into fuel according to an exemplary embodiment of the present invention.

Meanwhile, FIG. 5 is a flowchart illustrating a method of converting food waste into fuel according to an exemplary embodiment of the present invention.

Referring to FIGS. 3 and 5 described above, the method of converting food waste into fuel according to the exemplary embodiment of the present invention is performed by thermally converting the food waste. First, the food waste 200 is collected in a region and stored in the food waste storage tank 110 (S110).

Subsequently, the food waste stored in the food waste storage tank is transferred to the thermal decomposition reactor via the fermenter (S120). Here, the transferring device 120 may transfer the food waste 200 in the thermal decomposition reactor 150 at a controlled speed to thermally decompose the food waste 200.

Subsequently, the fermenter 130 temporarily contains the food waste stored in the food waste storage tank 110 and ferments the food waste (S130).

Subsequently, the food waste 200 stored in the food waste storage tank 110 is transferred to the thermal decomposition reactor 150 (S130).

Subsequently, the solar concentrator 140 concentrates sunlight in a predetermined region (S140). Here, there are pluralities of the solar concentrators 140 and thermal decomposition reactors 150. Each thermal decomposition reactor 150 is disposed in the predetermined region of a respective solar concentrator 140 on which a sunlight is concentrated, and provides the food waste in an amount that can be treated by the single solar concentrator 140.

Subsequently, the thermal decomposition reactor 150 disposed in the predetermined region on which the sunlight is concentrated thermally decomposes the transferred food waste, and a product including a biogas is discharged (S150). Here, the food waste thermally decomposed in the thermal decomposition reactor 150 may be discharged through the region in which the fermenter is disposed, and thereby thermal energy is provided to ferment the food waste contained in the fermenter.

Subsequently, the product discharged from the thermal decomposition reactor is collected (S160). Here, the biogas generated from the thermal decomposition reactor 150 and an air including an odor are separated from the product and collected, and the biogas may be methane gas.

Accordingly, the food waste is transferred in the thermal decomposition reactor, and thermally decomposed while passing through the predetermined region on which a sunlight is concentrated by the solar concentrator.

Figure 6:
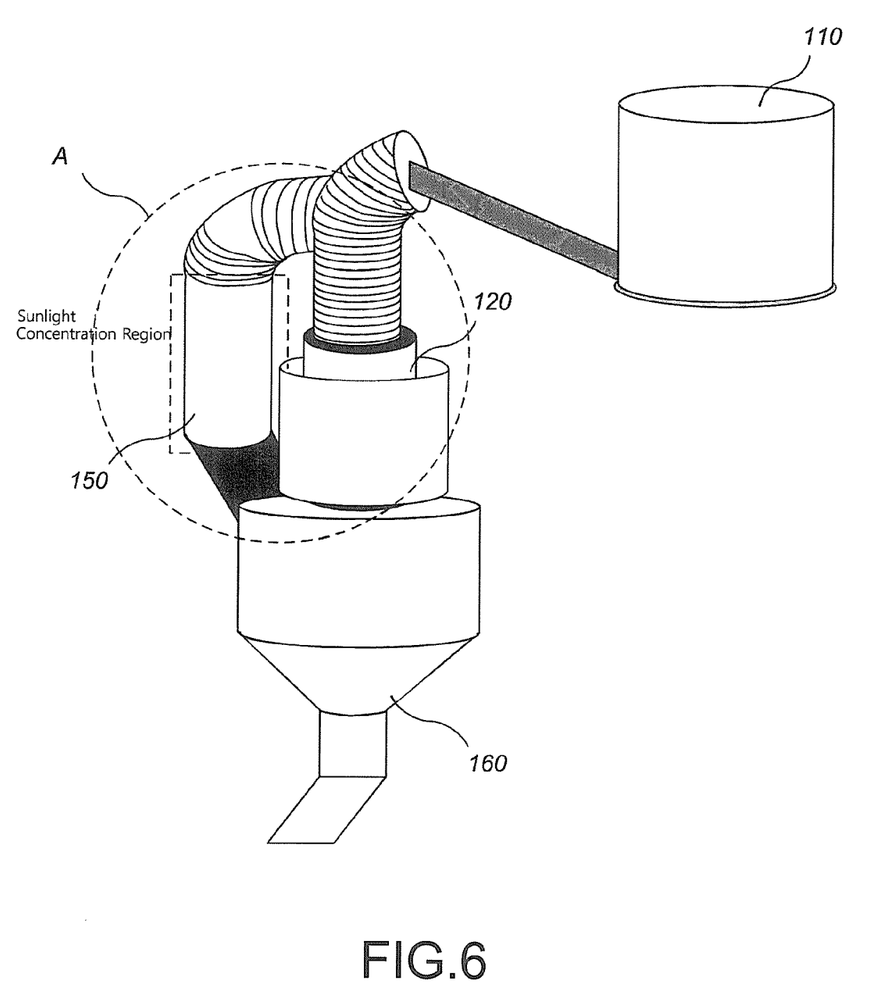
FIG. 6 is a diagram of a thermal decomposition reactor disposed for each solar concentrator in the system for converting food waste into fuel according to the exemplary embodiment of the present invention.

Meanwhile, FIG. 6 is a diagram of the thermal decomposition reactor disposed for each solar concentrator in the system for converting food waste into fuel according to the exemplary embodiment of the present invention.

Referring to FIG. 6, in the system 100 for converting food waste into fuel according to the exemplary embodiment of the present invention, the food waste 200 is put into each of a plurality of the thermal decomposition reactors 150 without being ground into a powder, and as shown as Reference mark A, the food waste 200 is transferred in the thermal decomposition reactor 150 and passes through the region on which a sunlight is concentrated by the solar concentrator 140.

In the system 100 for converting food waste into fuel according to the exemplary embodiment of the present invention, any thermal energy remaining after being used in thermal decomposition in the thermal decomposition reactor 150 is used in fermentation of the food waste 200. That is, to utilize thermal energy contained in the product thermally decomposed in the thermal decomposition reactor 150, the food waste 200 is thermally decomposed in each thermal decomposition reactor 150, and the thermal energy contained in the product is used in the fermentation of the food waste 200. Here, the fermenter 130 is disposed at a front end of the thermal decomposition reactor 150.

Figure 7:
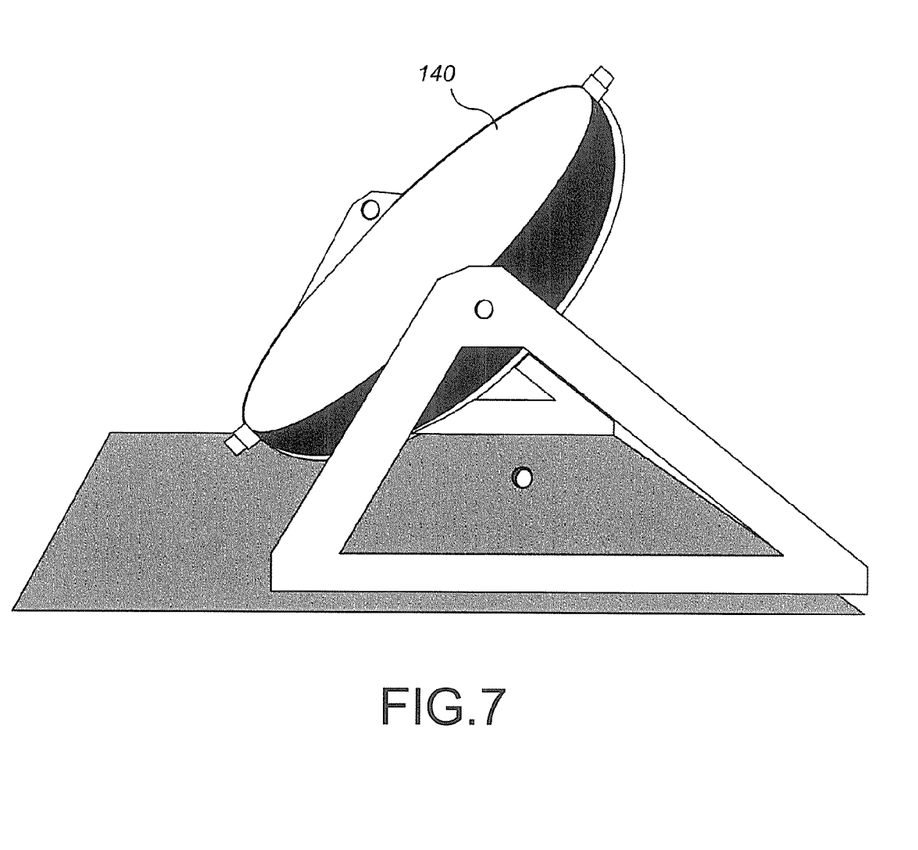
FIG. 7 is a diagram of a solar concentrator of the system for converting food waste into fuel according to the exemplary embodiment of the present invention.

Meanwhile, FIG. 7 is a diagram of a solar concentrator in the system for converting food waste into fuel according to the exemplary embodiment of the present invention.

Referring to FIG. 7, in the system 100 for converting food waste into fuel according to the exemplary embodiment of the present invention, each thermal decomposition reactor 150 is disposed in the predetermined region of each solar concentrator 140 on which a sunlight is concentrated, provides the food waste 200 in an amount that can be treated by the single solar concentrator 140, and controls a transfer speed of the provided food waste 200.

Figure 8:
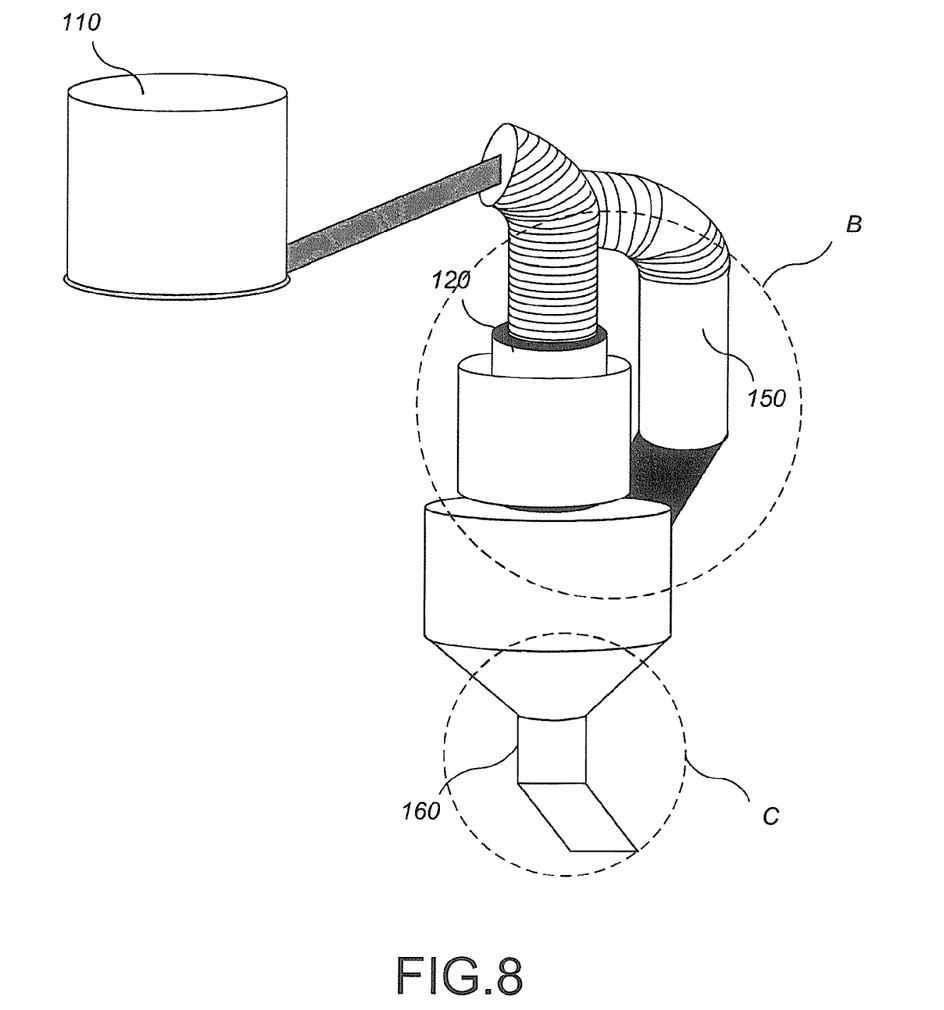
FIG. 8 is a diagram illustrating that a fermenter and a thermal decomposition reactor are formed to be sealed to remove an odor in the system for converting food waste into fuel according to the exemplary embodiment of the present invention.

Meanwhile, FIG. 8 is a diagram illustrating that a fermenter and a thermal decomposition reactor are formed to be sealed to remove an odor in the system for converting food waste into fuel according to the exemplary embodiment of the present invention.

Referring to FIG. 8, in the system 100 for converting food waste into fuel according to the exemplary embodiment of the present invention, as shown as Reference mark B, the thermal decomposition reactor 150 and the fermenter 130 are configured to be sealed, and in addition, as shown as Reference mark C, a generated biogas and an air containing an odor may be separated from a product, and collected using a collecting duct 160.

Meanwhile, the process of converting the food waste 200 into a fuel in the system 100 for converting food waste into fuel according to the exemplary embodiment of the present invention has been described, but another organic waste, other than the food waste, may be converted into a fuel.

According to the present invention, as an organic waste is transferred in a thermal decomposition reactor to pass through a region on which a sunlight is concentrated by a solar concentrator, the costs used in the conventional multiple solar concentrators and solar tower can be reduced, and the problem of high-temperature thermal decomposition occurring only at the focal point of a lens can be solved.

According to the present invention, a fermenter is disposed at a front end of the thermal decomposition reactor, and any thermal energy remaining after being used in the thermal decomposition reactor is used in fermentation of the food waste, thereby the efficiency of the system can be increased.

According to the present invention, the fermenter and the thermal decomposition reactor are formed to be sealed, and a generated biogas and an air containing an odor can be separated from a product and collected.

The above descriptions of the present invention only exemplify the present invention, and thus it can be understood to those of ordinary skill in the art that the present invention can be easily modified in another specific form without departing from the technical idea or essential characteristics of the present invention. Therefore, it should be understood that the exemplary embodiments described above are exemplified and limitative in all aspects. For example, the components described as a single type may be distributed, but equally, the components described as distributed may be integrated.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for converting food waste into a fuel product and a methane gas by thermally decomposing the food waste, comprising:
   a food waste storage tank in which food waste collected from a region is stored;
   a plurality of solar concentrators configured to collect a sunlight and concentrate the sunlight on a plurality of predetermined region;
   a plurality of thermal decomposition reactors, wherein each thermal decomposition reactor is disposed in a predetermined region on which the sunlight is concentrated by a corresponding solar concentrator of the plurality of solar concentrators and is configured to discharge the fuel product and the methane gas produced through thermal decomposition of the food waste;
   a transferring device configured to transfer the food waste to the plurality of thermal decomposition reactors from the food waste storage tank, wherein a transfer speed of the transferring device is controllable to provide the food waste to each thermal decomposition reactor in an amount that can be treated by a single associated solar concentrator;
   a controller, coupled to the solar concentrators, the thermal decomposition reactors, and the transferring device, wherein the controller is configured to control the transfer speed of the transferring device, a driving of the plurality of solar concentrators, and a thermal decomposition reaction in the plurality of thermal decomposition reactors;
   a plurality of fermenters, wherein each fermenter is disposed in a region at a front end of a corresponding thermal decomposition reactor of the plurality of thermal decomposition reactors and is configured to temporarily contain and ferment the food waste transferred from the food waste storage tank before provision to the corresponding thermal decomposition reactor; and
   a collecting duct configured to collect the methane gas generated from the plurality of thermal decomposition reactors, wherein the methane gas is separated and collected from the fuel product, wherein the plurality of thermal decomposition reactors and the plurality of fermenters are formed to be sealed to remove an odor, wherein each thermal decomposition reactor is configured to discharge the food waste thermally decomposed through the region in which the corresponding fermenter is disposed, so to provide thermal energy to ferment the food waste contained in the corresponding fermenter.

2. A method of converting food waste into a fuel product and a methane gas by thermally decomposing the food waste, comprising:

a) collecting food waste and temporarily storing the food waste in a food waste storage tank;

b) concentrating a sunlight in a plurality of predetermined regions by a plurality of solar concentrators, wherein each thermal decomposition reactor of a plurality of thermal decomposition reactors is disposed in a corresponding predetermined region of the plurality of predetermined regions;

c) transferring the food waste stored in the food waste storage tank to the plurality of thermal decomposition reactors via a plurality of fermenters, wherein each fermenter of the plurality of fermenters is disposed in a region at a front end of a different thermal decomposition reactor of the plurality of thermal decomposition reactors, the food waste is transferred by a transferring device, a transfer speed of the transferring device is controlled to provide the food waste to each thermal decomposition reactor in an amount that can be treated by a single corresponding solar concentrator, and the food waste passes through a predetermined region of the single corresponding solar concentrator;

d) fermenting the food waste in the plurality of fermenters before providing the food waste to the plurality of thermal decomposition reactors, e) thermally decomposing the transferred food waste in the plurality of thermal decomposition reactors disposed in the predetermined region on which the sunlight is concentrated and producing the fuel product and the methane gas;

f) separating and collecting the fuel product and the methane gas produced from the plurality of thermal decomposition reactors;

g) discharging the food waste thermally decomposed in the plurality of thermal decomposition reactors in operation (e) through the regions in which the corresponding fermenters are disposed to provide thermal energy to ferment the food waste contained in the plurality of fermenters, wherein a controller is coupled to the solar concentrators, the thermal decomposition reactors, and the transferring device, wherein the controller is configured to control a transfer speed of the transferring device, a driving of the plurality of solar concentrators, and a thermal decomposition reaction in the plurality of thermal decomposition reactors, wherein the plurality of thermal decomposition reactors and the plurality of fermenters are formed to be sealed to remove an odor.

* * * * *